United States Patent
Zhao et al.

(10) Patent No.: US 8,982,836 B2
(45) Date of Patent: Mar. 17, 2015

(54) SYSTEM AND METHOD FOR MINIMIZING LOSS OF IP CONTEXT DURING IRAT HANDOVER

(75) Inventors: Suli Zhao, San Diego, CA (US); Ajith T. Payyappilly, San Diego, CA (US); Shrawan K. Khatri, San Diego, CA (US); Siddharth D. Chitnis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 13/275,076

(22) Filed: Oct. 17, 2011

(65) Prior Publication Data

US 2013/0094471 A1    Apr. 18, 2013

(51) Int. Cl.
*H04W 4/00*   (2009.01)
*H04W 36/00*  (2009.01)
*H04W 76/06*  (2009.01)

(52) U.S. Cl.
CPC .......... *H04W 36/0011* (2013.01); *H04W 76/06* (2013.01)
USPC .......................................................... 370/331

(58) Field of Classification Search
None
See application file for complete search history.

(56) References Cited

U.S. PATENT DOCUMENTS

| | | | |
|---|---|---|---|
| 2006/0029020 A1* | 2/2006 | Jung et al. ..................... | 370/331 |
| 2006/0120287 A1 | 6/2006 | Foti et al. | |
| 2007/0104143 A1* | 5/2007 | Hori ............................... | 370/331 |
| 2008/0031183 A1* | 2/2008 | Aso et al. ...................... | 370/328 |
| 2009/0285175 A1* | 11/2009 | Nix ................................. | 370/331 |
| 2011/0051683 A1* | 3/2011 | Ramankutty et al. ......... | 370/331 |
| 2012/0069823 A1* | 3/2012 | Low et al. ..................... | 370/335 |
| 2012/0163345 A1* | 6/2012 | Camarillo et al. ............ | 370/333 |
| 2012/0230293 A1* | 9/2012 | Grinshpun et al. ........... | 370/331 |
| 2012/0269162 A1* | 10/2012 | Vesterinen et al. ........... | 370/331 |

FOREIGN PATENT DOCUMENTS

| | | |
|---|---|---|
| EP | 2079253 A1 | 7/2009 |
| EP | 2317822 A1 | 5/2011 |
| WO | 2010138634 | 12/2010 |

OTHER PUBLICATIONS

International Search Report and Written Opinion—PCT/US2012/060606—ISA/EPO—Dec. 13, 2012.

(Continued)

*Primary Examiner* — Dang Ton
*Assistant Examiner* — Ronald H Davis
(74) *Attorney, Agent, or Firm* — Arent Fox LLP

(57) ABSTRACT

A method for maintaining IP context during an inter RAT handover of a UE between an eHRPD network and an LTE network may include delaying a transfer of an Internet Protocol context for at least one active packet data network until an IP address for an attach (PDN) Packet Data Network has been assigned and in the case where the Internet Protocol address for the Attach Packet Data Network is not assigned, initiating a detach operation from the LTE network without the user equipment losing the Internet Protocol context of the at least one active Packet Data Network.

21 Claims, 6 Drawing Sheets

(56) References Cited

OTHER PUBLICATIONS

"LTE; General Packet Radio Service (GPRS) enhancements for Evolved Universal Terrestrial Radio Access Network (E-UTRAN) access (3GPP TS 23.401 version 10.5.0 Release 10)", Technical Specification, European Telecommunications Standards Institute (ETSI), 650, Route Dse Lucioles, F-06921 Sophia-Antipolis; France, vol. 3GPP SA 2, No. V10.5.0, Oct. 1, 2011, XP014068101.

3GPP TS 23.401 V10.0.0: "3rd Generation Partnership Project; Technical Specification Group Services and System Aspects; General Packet Radio Service (GPRS) enhancements for Evolved Universal Terrestrial Radio Access Network (E-UTRAN) access (Release 10)", (Jun. 2010), pp. 261, XP055007673.

* cited by examiner

SYSTEM AND METHOD FOR MINIMIZING LOSS OF IP CONTEXT DURING IRAT HANDOVER

FIELD

The features described below relate generally to wireless network operations. In particular, the features relate to the handover of a mobile device from one radio access technology (RAT) network to another radio access technology network (known as inter-RAT mobility or transfer).

BACKGROUND

More specifically, the user equipment (UE) or mobile device may access an EPC (Evolved Packet Core) in a LTE (Long Term Evolution) network in order to connect to and receive services from a plurality of PDNs (Packet Data Networks). Each PDN allows the UE to access an external data network that provides service(s) to the UE. Services include, but are not limited to, voice, data, SMS, GPS, text and more. The network operator may require the UE to connect to a special PDN (known as an attach PDN). A connection to the attach PDN requires that the UE receive the IP address of the attach PDN. In LTE, the UE may be prohibited from accessing any services on the operator's network without establishing a connection with the attach PDN.

SUMMARY

Embodiments are directed to a method for maintaining Internet Protocol context, including transferring IP context of at least one active packet data network (PDN) from a first network to a second network after a UE verifies receipt of an IP address of an attach PDN from the second network.

In yet another embedment, a mobile device configured to communicate with a wireless network. The mobile device is configured to transfer IP context of at least one active packet data network (PDN) from a first network to a second network after the mobile device verifies receipt of an IP address of an attach PDN from the second network.

Another embodiment of a method for maintaining Internet Protocol context, includes initiating an Inter-RAT handover on a user equipment between an eHRPD network and a LTE network. The user equipment may be configured to delay a transfer of an Internet Protocol context for at least one active packet data network until an Internet Protocol address for an attach Packet Data Network (PDN) has been received by the user equipment. If the Internet Protocol address for the attach PDN is not assigned, the user equipment initiates a detach operation from the LTE network without the user equipment losing the Internet Protocol context of the at least one active Packet Data Network.

DETAILED DESCRIPTION

Figure 1:
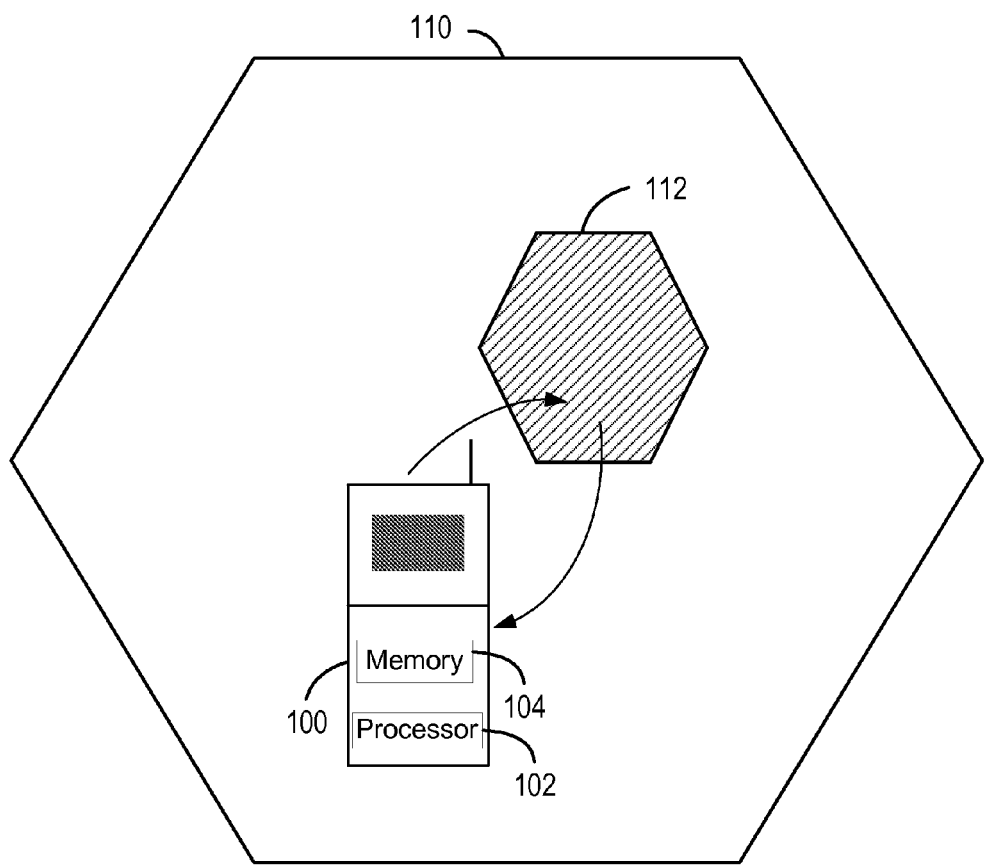
FIG. 1 is a schematic diagram of a UE that roams into and out of a LTE cell, according to an example embodiment.

Example acronyms of the terms used in this specification and the figures are provided below, however, the acronyms are not limited to the following descriptions.

APN—An APN is an Access Point Name.

eAN/ePCF—eAN/ePCF includes a logical entity in the Radio Access Network (RAN) used for radio communications with the UE and an evolved Packet Control Function entity (ePCF) that manages the relay of packets between the eAN and the HSGW.

EPC—Evolved packet core.

EPS—The evolved packet system includes EPC and the E-UTRAN.

EPS Bearer—An EPS bearer is a logical aggregate of one or more Service Data Flows (SDFs), for a PDN connection, receiving the same QoS treatment, carried over a service connection between a UE and a HSGW.

Handoff/Handover—In this specification, the terms "handoff" and "handover" are synonymous and used interchangeably.

Handover Attach—When performing an inter-technology handoff/handover between E-UTRAN and eHRPD, the UE sends an Attach Type parameter of "handoff" when re-attaching to packet data networks on the target technology in order to distinguish from the "Initial Attach" scenario.

HSGW—The HSGW is the HRPD Serving Gateway that connects the evolved HRPD access network with the evolved packet core (EPC) as a trusted non-3GPP access network. The HSGW provides the PMIPv6 mobile access gateway (MAG) function to support layer 3 mobility with the P-GW (LMA).

Inter-HSGW Mobility with Context Transfer—Inter-HSGW mobility with context transfer occurs when a source HSGW transfers context for a UE to a target HSGW using the H1 interface, including the use of the H2 interface for data packet forwarding.

UE is the user equipment.

Symbols and Abbreviations

3GPP 3rd Generation Partnership Project

3GPP2 3rd Generation Partnership Project 2

AAA Authentication, Authorization, Accounting

ABNF Augmented Backus-Naur Form

AKA Authentication and Key Agreement

AMBR Aggregated Maximum Bit Rate

APN Access Point Name

APN-AMBR per APN Aggregate Maximum Bit Rate

ARP Allocation and Retention Priority

AT Access Terminal

AVP Attribute Value Pair

BAK BCMCS Access Key

BBERF Bearer Binding and Event Reporting Function

BCE Binding Cache Entry

BCM Bearer Control Mode

BCMCS Broadcast Multicast Service

BE Best Effort

BLOB BLock Of Bits

CCP Compression Configuration Protocol

CMIP Client Mobile IP
CSIM cdma2000 Subscriber Identity Module
DHCP Dynamic Host Configuration Protocol
DL Down Link
eAN evolved Access Network
EAP Extensible Authentication Protocol
eHRPD evolved High Rate Packet Data
eNB evolved NodeB
EPC Evolved Packet Core
ePCF evolved Packet Control Function
EPS Evolved Packet System
E-UTRAN Evolved Universal Terrestrial Radio Access Network
FQDN Fully Qualified Domain Name
GBR Guaranteed Bit Rate
GRE Generic Routing Encapsulation
HRPD High Rate Packet Data
HSGW HRPD Serving Gateway
HSS Home Subscriber Server
IANA Internet Assigned Numbers Authority
IMSI International Mobile Subscriber Identity
IP Internet Protocol
IP-CAN IP Connectivity Access Network
LCP Link Control Protocol
LMA Local Mobility Agent
MAG Mobile Access Gateway
MBR Maximum Bit Rate
MME Mobility Management Entity
MN NAI Mobile Node Network Access Identifier
MRU Maximum Receive Unit
MSID Mobile Station ID
MSK Master Session Key
MUPSAP Multiple PDN Connections to A Single APN
NAI Network Access Identifier
OUI Organizationally Unique Identifier
PGW Packet Data Network Gateway (specified by 3GPP)
PBA Proxy Binding Acknowledgement
PBU Proxy Binding Update
PCC Policy and Charging Control
PCEF Policy and Charging Enforcement Function
PCO Protocol Configuration Options
PCRF Policy and Charging Rules Function
PDN Packet Data Network
PDN-ID PDN Identifier
PDSN Packet Data Serving Node
PMIP Proxy Mobile IP
PPP Point-to-Point Protocol
QCI QoS Class Index
QoS Quality of Service
RA Router Advertisement
RAN Radio Access Network
RAT Radio Access Technology/Radio Access Type
RK Registration Key
ROHC RObust Header Compression
RS Router Solicitation
RSVP Resource Reservation Protocol
S-GW Serving Gateway (specified by 3GPP)
SDF Service Data Flow (specified by 3GPP)
SK Session Key
SLAAC Stateless Address Autoconfiguration
TK Temporary Key
TNL Transport Network Layer
TFT Traffic Flow Template
TLV Type Length Value
UATI Universal Access Terminal Identifier
UE User Equipment
UE-AMBR per UE Aggregate Maximum Bit Rate
UL Uplink
VSA Vendor Specific Attribute
VSNCP Vendor Specific Network Control Protocol
VSNP Vendor Specific Network Protocol An example Inter-RAT handover occurs when a UE roams from an eHRPD (evolved High Rate Packet Data) network to a LTE network. In an example embodiment, a UE may roam from one type of network into another type of network. Establishing a connection to the LTE network can require two steps. The first step includes the LTE attach procedure that involves the UE registering with the network to receive services during an attach procedure via NAS (Non-Access Stratum) signaling. During the LTE attach procedure, a PDN connectivity request to the attach-PDN is sent with the attach request message. After the first step is completed, the second step to establish a connection to the LTE network includes the UE acquiring IP addresses for the attach PDN and other PDNs using parallel processing.

The embodiments of the methods and systems described below are intended to address the failure to receive an IP address for the attach PDN. Success in attaching refers to the IP context for attach PDN being received by the UE. Upon a failure to receive an IP address, the UE must detach from the LTE network because without the IP address of the attach PDN the UE will not be able to access any services from the LTE network. However, detaching from the LTE network at this stage may lead to a loss in IP context information for the attach-PDN and the loss of IP context (IP address, DNS server address, PCSCS address, APN name, default router address, IP type, PDN ID and other information) for the other PDNs that have already been transferred to the LTE network. The loss of IP context may cause interruptions for the service being provided to the UE.

Detaching from LTE network may be performed to eliminate or minimize the loss of IP context for the other PDNs that were already transferred to LTE. For example, the UE may send a detach request using a service manager (a module located in the UE that can trigger LTE attach/detach procedures) to the LTE network through the air interface. In particular, the UE notifies the service manager upon experiencing an IP address assignment failure. The service manager may be part of the software and/or hardware configured to be in communication with a processor configured to execute instructions on the UE. When the service manager triggers a LTE detach the IP context for attach PDN is released at the UE. Using the service manager may cause a loss in the IP context information for the attach PDN and other active PDNs. The loss of the IP context may lead to the UE informing the user that the IP data has been lost or not available using a display screen or a audible warning on the UE. During the LTE detach procedure, the IP context information is released at the network for the PDNs that have been successfully transferred to LTE. If the detach request message is not receive by the network, the IP context continuity for other PDNs is maintained after the UE performs a handover back to the eHRPD network.

Another method of performing a detach procedure may include using the control plane stack. If the IP address assignment for the attach PDN fails, then the control plane data stack may trigger the LTE detach without notifying the service manager. Using the data stack, the IP context for the attach PDN is not released at the UE. Using the control plane data stack may cause a loss in the IP context information for the other PDNs. During the detach procedure, IP context information is released at the network for the PDNs that have been successfully transferred to LTE. If the detach request message is not received by the network, the IP continuity for all PDNs is likely maintained after the UE performs handover back to the eHRPD network.

In one example embodiment, the transfer of the IP Context for the other PDNs may be delayed until the IP address for the attach PDN has been received by the UE. In particular, AMSS (Advanced Mobile Subscriber Software) that is part of the UE shall not transfer the other PDNs IP context until the IP address assignment for the attach-PDN is completed. PDN connectivity for other active PDNs are transferred after the IP address assignment for attach PDN has been successfully received by the UE. Delaying the transfer of the IP context for the other PDNs until IP address assignment for the attach-PDN can be performed by using the service manager or the data stack detach mechanisms.

In one embodiment, if the IP address assignment for attach PDN fails, the UE may declare failure and notify the service manager. The service manager may send an LTE detach signal to the network and the other modules of the UE, and IP context for the attach PDN is released by the UE. The IP context for the attach PDN is lost, but the IP context for the other PDNs may be recovered when the UE is transferred back to the eHRPD network.

In another embodiment, the AMSS shall not transfer the IP context for the other PDNs until IP address assignment for the attach PDN has been completed. If IP address assignment for attach PDN fails, then the control plane data stack may send a detach request to the other modules on the UE, without notifying service manager. In this embodiment, the IP context for the attach PDN is not released at the UE. If the network receives the detach request message from the UE, the network will release the IP context for the attach PDN and the IP context for the attach PDN may be deleted.

If detach request message is not received by the network, IP continuity for attach PDN is likely maintained after UE performs the handover attach to the attach PDN after the UE moves back to the eHRPD network. Accordingly, using the data stack and delaying the transfer of the IP context for the other PDNs may allow the UE to maintain the IP context for the attach PDN and the other PDNs when the UE switches back to the eHRPD network when there is an IP address assignment failure in the LTE network. The following description relate to the figures that illustrate, in a non-limiting manner, the embodiment of the system and method for minimizing the loss of IP context during an IRAT handover from a first network to a second network and back to the first network. In an example embodiment, the first network may be an eHRPD network and the second network may be a LTE network.

The drawing in FIG. 1 is a schematic diagram of a UE 100 that roams into and out of a LTE cell 112. The UE 100 can be, but is not limited to being, a mobile device, cell phone, smart phone, computer or other wireless communication device. Additionally, the UE 100 may include, but is not limited to, one or more memories, such as memory 102, or one or more processors, such as processor 104, or both, wherein one or more of the memories, processors, and/or additional components, are specially configured to perform the functionality described herein. The LTE cell 112 described in greater detail below may include a wireless communication tower known as an eNode B which creates a wireless communication network which provide services to the UE 100. The cell 110 covers an area where the UE 100 can communicate wirelessly with various network components.

In an example embodiment, the UE 100 has been authenticated and in active or passive wireless communication with cell 110 and as the UE 100 is moved to be in a communicative range of the LTE cell 112, the UE 100 attempts to perform a IRAT handover to the LTE cell 112. In an example embodiment, the cell 110 may be an eHRPD cell and the UE 100 may be located within a communicative range of the LTE cell 112. In order to perform the IRAT handover to LTE cell 112 the UE 100 may send an attach request and a PDN connectivity request to the MME of the LTE cell 112. After the attach request is accepted the UE 100 transfers the IP context for the attach PDN and all other active PDN connections. If the LTE attach succeeds, but the IP address assignment for the attach PDN fails, then the UE 100 detaches from the LTE cell 112. If other RAT (Radio Access Technology) is available, then the UE 100 shall move to the other RAT. In an example embodiment, the UE 100 may return to cell 110, or an eHRPD cell. For example, in one aspect but not limited to such an aspect, the processor 102 of the UE 100 may have circuitry and/or logic, or both, to perform the above-noted functionality. In another example, in one aspect but not limited to such an aspect, the memory 104 of the UE 100 may store specially programmed computer-readable instructions that, when executed by the processor 102, cause the UE 100 to perform the above-noted functionality.

Figure 2:
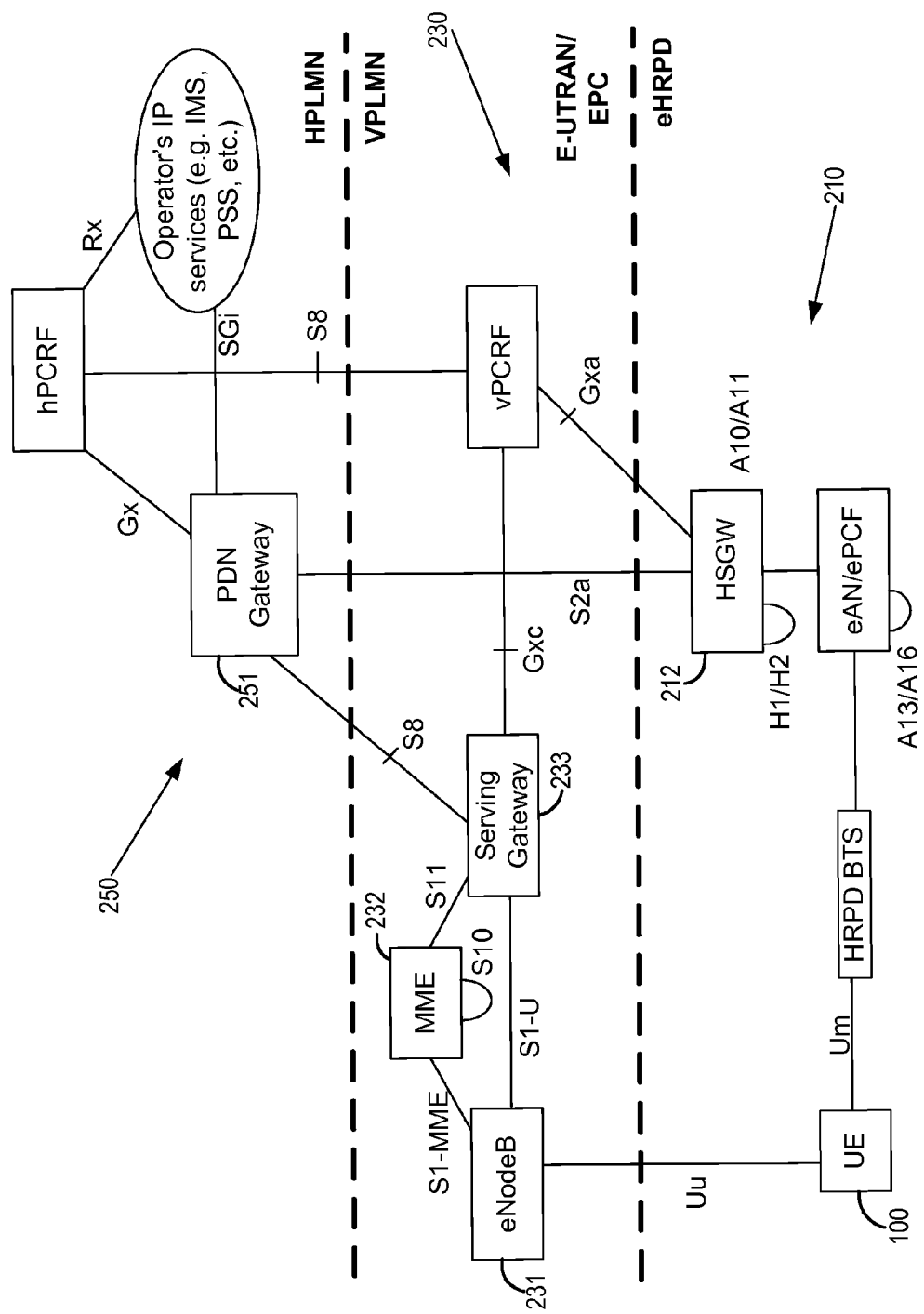
FIG. 2 is a schematic diagram of the interaction between an EPC/E-UTRAN and an eHRPD network.

The drawing in FIG. 2 is a schematic diagram of the E-UTRAN and eHRPD interworking architecture. FIG. 2 illustrates the UE 100 that is configured to wirelessly communicate with eHRPD network 210. The eHRPD network 210 may include a HSGW 212 that is in communication with the PDN Gateway 251. In an example embodiment, the PDN Gateway 251 provides the IP addresses for the attached PDN and all other PDNs to the HSGW 212 to allow the UE 100 to access various operator provided services, such as but not limited to, voice, data, IMS, PSS, GPS and other services. The UE 100 may establish communication with the eHRPD network by performing the PPP/VSNCP negotiation. The PPP negotiation may include link control, authentication and network control protocol. The UE 100 may be attached to one or more PDNs through the HSGW 212.

FIG. 2 illustrates the UE 100 that may be in wireless communication with components of the E-UTRAN/EPC network 230, e.g., through one or more communication components. For example, the UE 100 may include, but is not limited to, a communication component such as one or more of a transceiver, a transmitter, a receiver, or any combination thereof. The E-UTRAN/EPC network 230 includes one or more of each of the following hardware elements: eNodeB 231, MME 232 and serving gateway 233. The E-UTRAN/EPC network 230 includes various other components that are not shown in FIG. 2. When the UE 100 detects the E-UTRAN/EPC 230, the UE 100 and the eNodeB 231 may begin NAS signaling to authenticate the UE 100 with the LTE network. Next, the attach procedures begins between the UE 100 and the PDN gateway 251. The attach procedures may include the UE 100, MME 232 and serving gateway (SGW) 233 requesting IP addresses for the attach PDN and all other PDNs that the UE 100 was connected to while the UE 100 was communicating with the eHRPD network 210. (See FIG. 1.)

The serving gateway 233 may communicate with the PDN Gateway 251 to receive the IP addresses for various PDNs from the PDN Gateway 251. In most instances, the UE 100 receives an IP address for the attach PDN and all other PDNs from the serving gateway 233. Once a connection with the serving gateway 233 is established the connection with the HSGW 212 is severed. In various embodiments, the UE 100 may sever the connection prior to receiving the IP address from the serving gateway 233. Severing the connection or detaching refers to a UE 100 either deleting the IP context information or the network deleting the IP context information relating to a particular network (i.e. the eHRPD network 210 in the example discussed in this disclosure).

The reference points that are shown in FIG. 2 are described in greater detail below.

H1/H2—The H1 reference point carries signaling information between a source HSGW (S-HSGW) and a target HSGW (T-HSGW) for optimized inter-HSGW handoff. The H2 reference point carries user traffic, both uplink and downlink, from a source HSGW (S-HSGW) to a target HSGW (T-HSGW) for optimized inter-HSGW handoff.

Gxa—The Gxa reference point connects the Policy and Charging Rules Function (PCRF) in the 3GPP EPC to the BBERF in the HSGW in the 3GPP2 eHRPD access network.

Pi* Reference Point—The protocol used on the Pi* reference point connects the HSGW to the 3GPP2 AAA Proxy.

S2a—The S2a connects the PDN Gateway in the 3GPP EPC to the HSGW in the 3GPP2 eHRPD network. It provides the user plane with related control and mobility support between eHRPD access and the P-GW.

Figure 3:
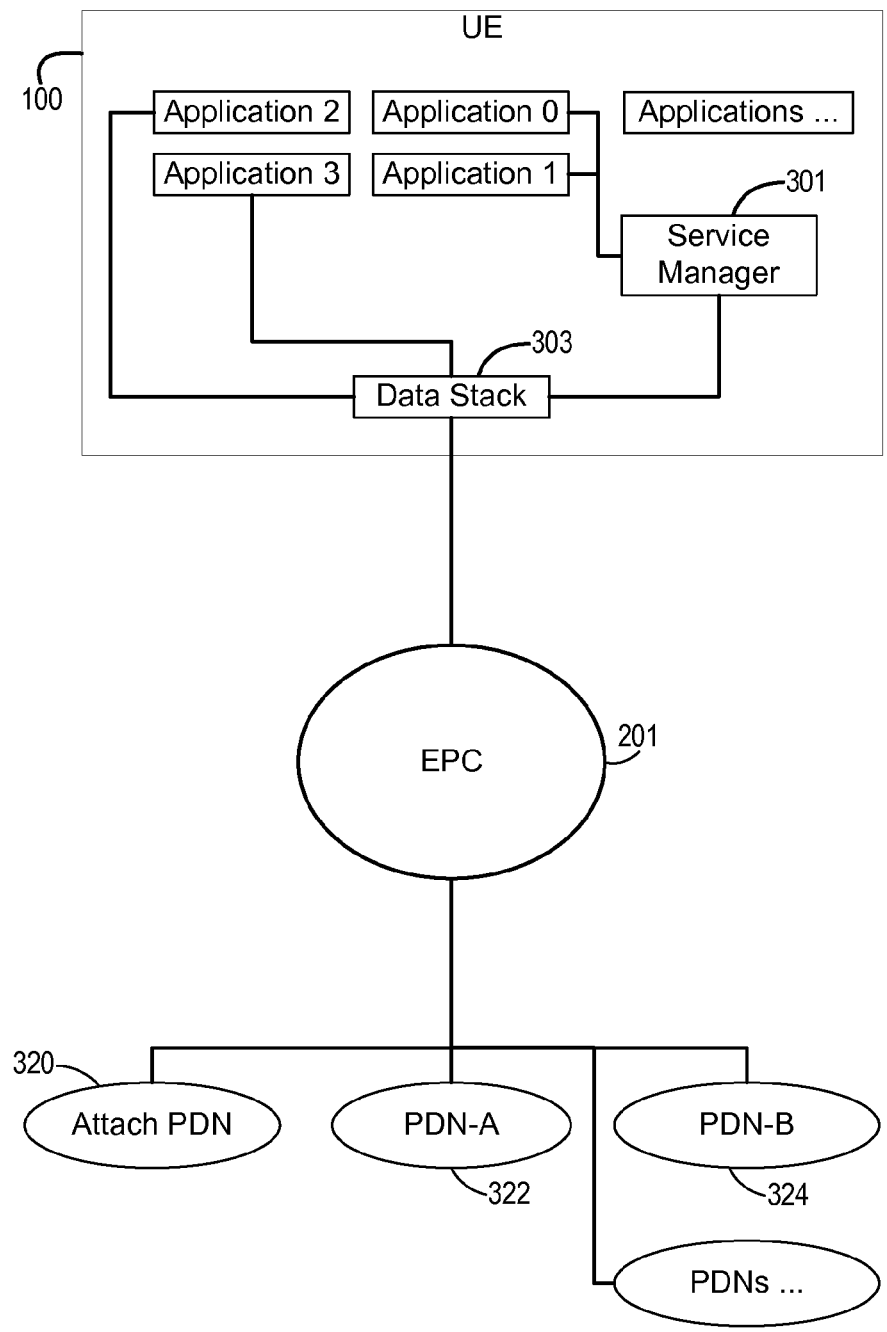
FIG. 3 is a schematic diagram of the interaction between the modules of the UE and the EPC, according to an example embodiment.

FIG. 3 shows the UE 100 including a service manager 301, data stack 303 and a plurality of applications that may be executed on the UE 100. The service manager 301 and the data stack 303 are in electric communication with each other. The service manager 301 and/or data stack 303 may be implemented as a circuit or may be configured to execute on a processor, e.g. processor 102, located in the UE 100. The UE 100 also includes, e.g. in memory 104, example applications 0 and 1 that send or receive data through the service manager 301. Applications 2 and 3 send or receive data through the data stack 303. As described above the UE 100 may be in wireless communication with the EPC 201 and various other entities, e.g. through one or more transceivers and/or transmitters and/or receivers. The EPC 201 may provide the UE 100 with access to various PDNs. For example, as shown in FIG. 3 the EPC 201 may allow applications that are running on the UE 100 to access the attach PDN 320, PDN-A 322, and PDN-B 324.

The UE 100 accesses the EPC and connects to the PDNs to receive services. In order to receive services from any other PDNs, the network operator requires that the UE 100 must connect with the attach PDN 320. Attach PDN 320 is also the PDN that the UE 100 connects to during the LTE attach procedure described in greater detail below. On an LTE network, the UE 100 is not allowed to access the operator's network (except for emergency phone calls) without connecting to the attach PDN 320. In an example embodiment, the attach PDN may be IMS (Internet Protocol Multimedia Subsystem). The IMS is an architectural framework for delivering Internet Protocol (IP) multimedia services via UTRAN and E-UTRAN. Other examples of an attach PDN 320 may include the PDN that provide voice services to the UE or other essential PDNs. The network operator may specify other PDNs as the attach PDN. In other examples, one or more PDNs may be considered to be the attach PDNs by the network operator.

In an example embodiment, PDN-A 322 may provide services to applications 0 and 2 and PDN-B 324 may provide services to applications 1 and 3. In other embodiments, there may be more than one PDN that may be connected to the UE 100 and there may be more than one application that can be executed concurrently on the UE 100.

The service manager 301 triggers attach/detach procedures for the LTE network (including E-UTRAN/EPC 230). The IP context for the attach PDN is released at the UE, if the service manager 301 triggers the LTE detach procedures. The attach procedures include the UE 100 sending and receiving wireless signals that authenticate and allow the UE 100 to receive data via the LTE network.

Figure 4:
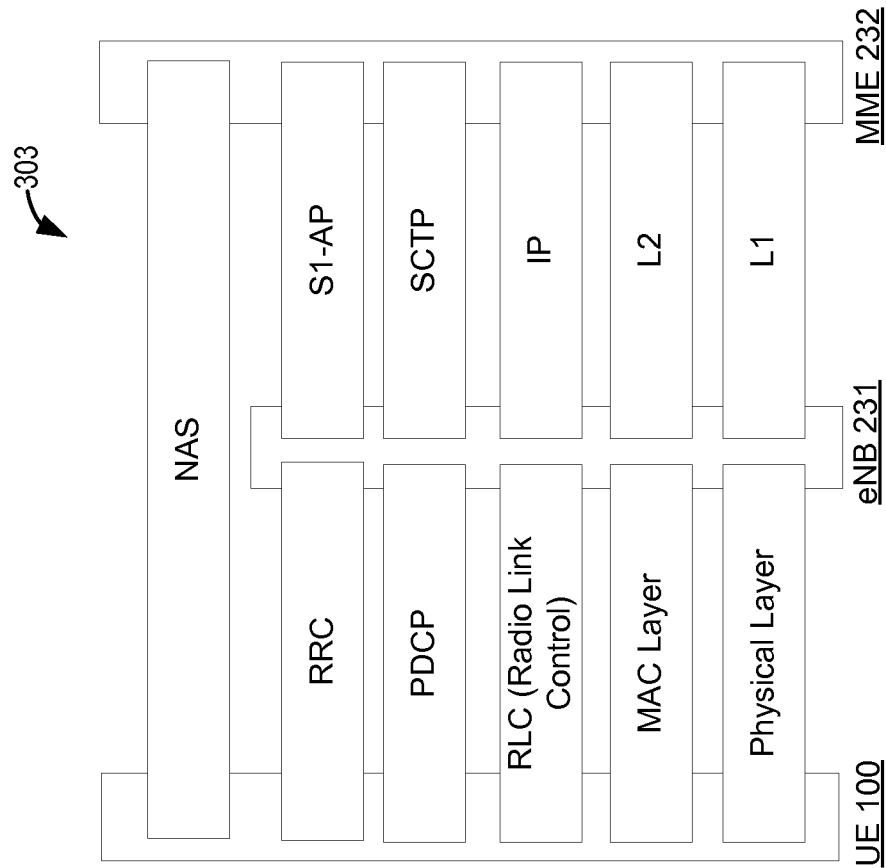
FIG. 4 illustrates the data stack that includes various layers from the LTE architecture.

In one embodiment, the data stack 303 is a control plane data stack shown in greater detail in FIG. 4. Upon the UE's request, the data stack 303 may be configured to detach from the LTE network. If the service manager 301 is not informed regarding the initiation of the detach request, then the LTE network may not receive the detach request from the data stack 303. If the LTE network fails to receive the detach request the IP context for all PDNs may be preserved.

FIG. 4 shows the control plane data stack 303 that includes various layers in the stack from the LTE architecture. The NAS layer that is shown at the top of the data stack 303 is used for NAS signaling that performs the attach and detach procedures. When the data stack 303 is used for the detach procedure, the data stack 303 may not send a signal to the service manager 301 informing the service manager that the UE 100 is detaching from the LTE network. The UE 100 may generate a signal to the data stack 303 to initiate an LTE detach NAS signaling.

During the data stack 303 detach procedure, the IP context for the attach PDN is not released at the UE 100. Not released at the UE 100 may include the UE 100 storing the IP context information for the attach PDN in a memory location. In other words the UE 100 may retain the IP context information for the attach PDN. Since the service manager 301 was uninformed regarding the detach, the LTE network may not receive a signal from the UE 100 regarding the detach. The LTE network receiving the signal from the UE 100 may preserve the IP context for all other PDNs, as discussed in greater detail below.

For example, in one aspect but not limited to such an aspect, the processor 102 of the UE 100 may have circuitry and/or logic, or both, to perform the above-noted functionality in combination with service manager 301 and/or data stack 303. In another example, in one aspect but not limited to such an aspect, the memory 104 of the UE 100 may store specially programmed computer-readable instructions that, when executed by the processor 102, cause the UE 100 to perform the above-noted functionality in combination with service manager 301 and/or data stack 303.

Figure 5:
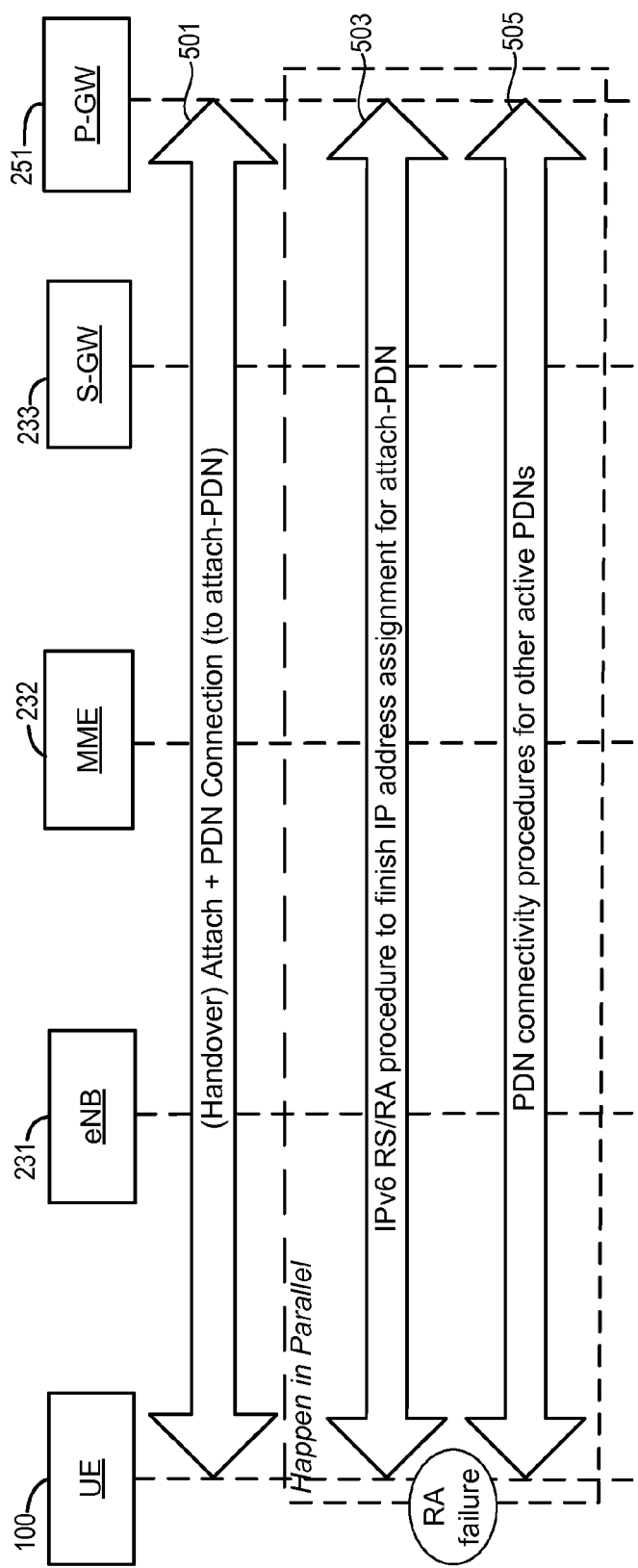
FIG. 5 illustrates a flow chart of a process that is used to receive the IP address for the attach PDN and establish the PDN connectivity for other active PDNs.

FIG. 5 illustrates a flow chart of a process that is used to receive the IP address for the attach PDN and establish the PDN connectivity for other active PDNs. Once the UE 100 detects the LTE network, the UE 100 begins to register with the network to receive services during the attach procedures by NAS signaling. During the LTE attach, the PDN connectivity request from the UE 100 is sent to the attach PDN with the attach request message, in step 501. A processor in the UE 100 may be configured to instruct the radio antennas in the UE 100 to generate wireless signals that communicate with the eNodeB 231 and MME 232. In turn, the MME 232 may generate signals and communicate with the serving gateway 233 and PDN gateway 251 to generate an attach accept. The MME 232 may send a signal to the eNodeB 231 that leads to an attach accept being sent to the UE 100 and the activation of the default EPS bearer.

After the attach succeeds in step 501, the UE 100 continues to acquire IP addresses if they were not acquired through the NAS signaling. For example, the UE 100 receives an IPv6 address assigned via RS/RA procedures or the UE 100 receives an IPv4 address assigned via DHCPv4 procedures. In an example embodiment, the UE 100 may not have a good connection with the LTE network due to interference or other factors.

Next, steps 503 and 505 are performed in parallel. At step 503, the IPv6 RA procedures to finish IP address assignment for attach-PDN may fail due to communication issues or other problems. The RA procedure failure is an example failure that may occur. Other types of failures may lead to the IP address of the attach PDN not being communicated to the UE 100. However, since step 505 is being performed in parallel with step 503, the PDN connectivity for other active PDNs may have been transferred to the LTE network. Since there was a failure at step 503 and the attach PDN IP address assignment has failed, the network operator will not permit the UE 100 to access services on all other active PDNs. Accordingly, the UE 100 may experience a loss of the IP context for at least the active PDNs that were transferred to LTE. The UE 100 must perform the detach procedure to return back to the eHRPD network.

Figure 6:
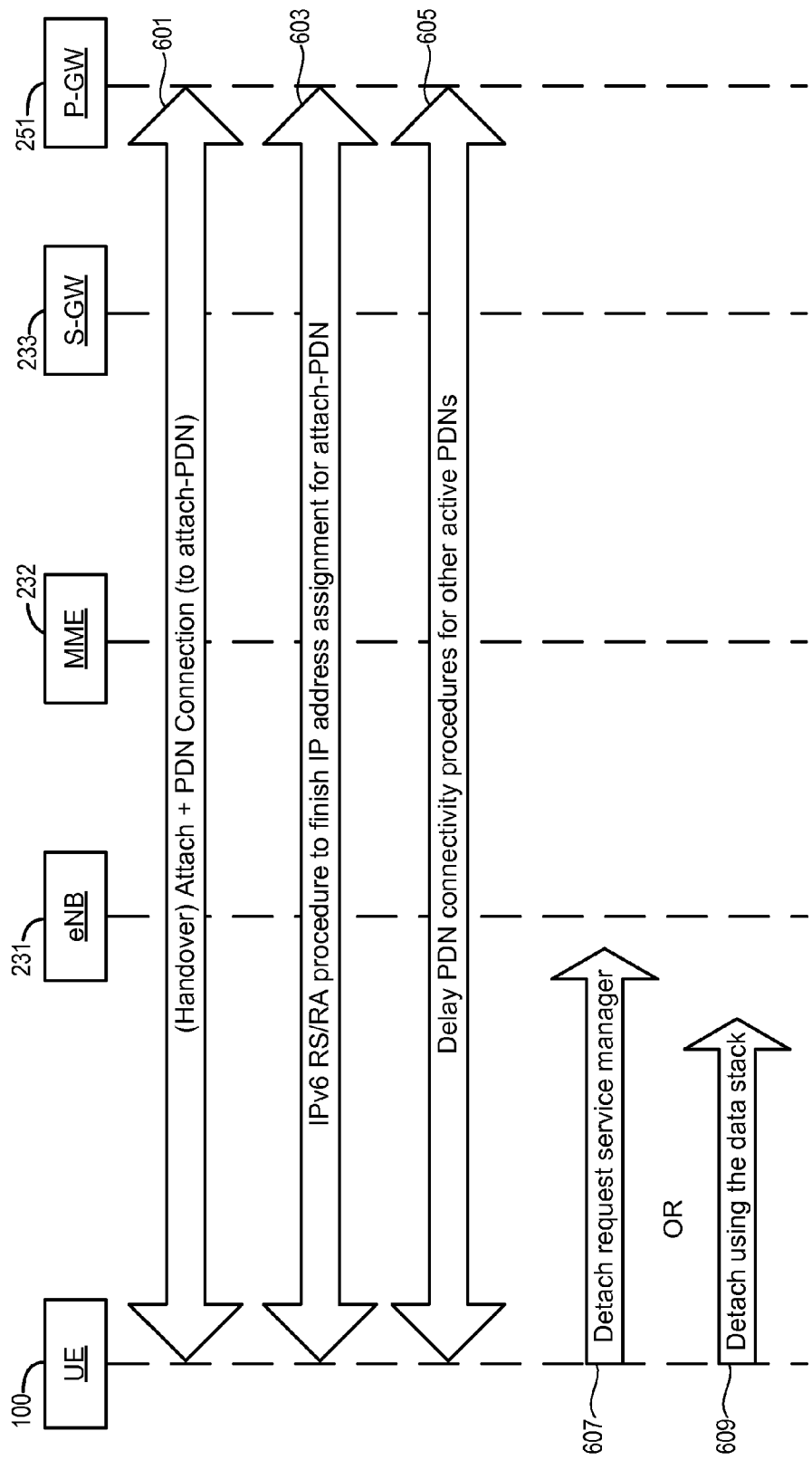
FIG. 6 illustrates a flow chart of a process that is used to receive the IP address for the attach PDN and detach the UE from the LTE network, according to an example embodiment.

FIG. 6 illustrates a flow chart of a process that is used to receive the IP address for the attach PDN and establish the PDN connectivity for other active PDNs. In this embodiment, the PDN connectivity procedures for other active PDNs is delayed and performed after the IP address assignment for the attach PDN is successful. Accordingly, the process shown at step 601 occurs first. For example at step 601, the handover attach and PDN connection to the attach PDN is sent to the PDN gateway 251. Next at step 603, the IPv6 RS/RA procedures may complete the IP address assignment of the attach PDN to the UE. After step 603 succeeds, the PDN connectivity procedures for other active PDNs are initiated at step 605. In one embodiment, the PDN connectivity procedures for PDNs other than the attach PDN are performed after the UE 100 receives the IP address of the attach PDN. In one embodiment, the delaying of the PDN connectivity procedures for the other PDNs may be accomplished by using a timer or a verification signal. In one embodiment, the verification signal may be generated by a processor within the UE 100, when the UE 100 confirms that an IP address was received for the attach PDN.

If in step 603 the RS/RA procedure fails, then the UE 100 may initiate the detach procedures. The UE 100 has various options with respect to sending a detach request. In an example embodiment, the UE 100 may send a detach request using the service manager in step 607. Moreover, since the PDN connectivity procedures for other active PDNs was not initiated, the UE 100 retains the IP context information for the other active PDNs on the eHRPD network. Accordingly, when the UE 100 detaches from the LTE network, using the service manager 301 the IP context of the attach PDN is released at the UE 100. In this embodiment, if the detach request message is not received by the LTE network, the IP continuity for other PDNs is likely maintained after the UE 100 performs handover attach to other PDNs after moving back to the eHRPD network. One advantage of this embodiment is that the danger of the UE 100 being connected to the LTE network without being connected to the attach PDN is reduced. Another advantage may be that the IP context for other PDNs may be recovered after the handover back to the eHRPD network, if the detach request message from the UE 100 is not received by the network while the UE 100 is on LTE. In various embodiments, the detach request may not be received by the network since the UE 100 was unable to receive the IP address from the attach PDN.

In another embodiment, the UE 100 may use the data stack 303 to initiate the detach from the LTE network as shown in step 609. When using the data stack 303 the detach request may be sent using the NAS layer. The data stack 303 triggers the detach from the LTE network without notifying the service manager 301. Failure to notify the service manager 301 allows the UE 100 to retain the IP context for the attach PDN. However, if the network receives the detach request message from the UE 100, the network will release the IP context for the attach-PDN and IP context for attach PDN could be lost. If the network does not receive the detach request, the IP continuity for all PDNs may be maintained after the UE 100 performs a handover attach to PDNs after moving back to eHRPD.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such non-transitory machine-readable media can be any available media, such as non-transitory storage media, that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing devices in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method for maintaining an Internet Protocol (IP) context during an inter radio access technology (IRAT) handover, comprising:
    sending a handover attach request message to an attach packet data network (PDN) of a second RAT when a user equipment (UE) is camped on a cell of a first RAT;
    sending a PDN connectivity request to one or more other active PDNs of the second RAT;
    determining whether an IP address is received from the attach PDN; and
    transferring the IP context from a PDN of the first RAT to the one or more other active PDNs of the second RAT when the UE receives the IP address from the attach PDN of the second RAT or sending a detach request when the IP address from the attach PDN is not received at the UE.

2. The method of claim 1, wherein the first RAT is evolved High Rate Packet Data (eHRPD) and the second RAT is long term evolution (LTE).

3. The method of claim 1, wherein the detach request includes the UE initiating non-access stratum (NAS) signaling using a data stack.

4. The method of claim 3, wherein the data stack includes the UE retaining information of the attach PDN that was received by the UE.

5. The method of claim 1, wherein the detach request includes the UE initiating a detach procedure using a service manager.

6. The method of claim 1, wherein after the detach request, the UE connects with a cell of the first RAT such that the UE retains information of the IP context for each active PDN.

7. A mobile device configured to maintain an Internet Protocol (IP) context during an inter radio access technology (IRAT) handover, comprising:
    sending a handover attach request message to an attach packet data network (PDN) of a second RAT when the mobile device is camped on a cell of a first RAT;
    sending a PDN connectivity request to one or more other active PDNs of the second RAT;
    determining whether an IP address is received from the attach PDN; and
    transferring the IP context from a PDN of the first RAT to the one or more other active PDNs of the second RAT when the UE receives the IP address from the attach PDN of the second RAT or sending a detach request when the IP address from the attach PDN is not received.

8. The mobile device of claim 7, wherein the first RAT is evolved High Rate Packet Data (eHRPD) and the second RAT is long term evolution (LTE).

9. The mobile device of claim 7, wherein the detach request includes the mobile device configured to initiate non-access stratum (NAS) signaling using a data stack.

10. The mobile device of claim 9, wherein using the data stack includes the mobile device configured to retain information of the attach PDN that was received by the mobile device.

11. The mobile device of claim 9, wherein the detach request includes the mobile device configured to initiate a detach procedure using a service manager.

12. The mobile device of claim 7, wherein the mobile device is configured to establish a connection with the PDN of the first RAT after a detach procedure is successful.

13. The mobile device of claim 12, wherein the mobile device is configured to retain information of the IP context for each active PDN.

14. An apparatus for maintaining an Internet Protocol (IP) context during an inter radio access technology (IRAT) handover, comprising:
- means for sending a handover attach request message to an attach packet data network (PDN) of a second RAT when a user equipment (UE) is camped on a cell of a first RAT;
- means for sending a PDN connectivity request to one or more other active PDNs of the second RAT;
- means for receiving an IP address from the attach PDN; and
- means for transferring the IP context from a PDN of the first RAT to the one or more other active PDNs of the second RAT after the UE receives the IP address from the attach PDN of the second RAT.

15. The apparatus of claim 14, further comprising:
means for sending a detach request, wherein the means for sending the detach request includes using a data stack.

16. The apparatus of claim 15, wherein the means for sending the detach request using the data stack includes a means for recovering the IP context for at least one active PDN of the first RAT.

17. The apparatus of claim 14, wherein the IP context includes at least one of the IP address and a domain name server address.

18. The apparatus of claim 15,
wherein the means for sending the detach request includes using a service manager to detach from the PDN of the second RAT; and
wherein using the service manager includes recovering the IP context for the at least one active PDN from the first RAT.

19. The apparatus of claim 18, wherein the apparatus is configured to establish a connection with an active PDN of the first RAT after a detach procedure is successful without a loss in IP context for any active PDN.

20. The apparatus of claim 14, wherein the first RAT is evolved High Rate Packet Data (eHRPD) and the second RAT is long term evolution (LTE).

21. A non-transitory computer readable storage media configured to store a program product that, when executed on at least one processor performs a method for maintaining an Internet Protocol (IP) context during an inter radio access technology (IRAT) handover, comprising:
- sending a handover attach request message to an attach packet data network (PDN) of a second RAT when a user equipment (UE) is camped on a cell of a first RAT;
- sending a PDN connectivity request to one or more other active PDNs of the second RAT;
- receiving an IP address from the attach PDN; and
- transferring the IP context from a PDN of the first RAT to the one or more other active PDNs of the second RAT after the UE receives the IP address from the attach PDN of the second RAT.

* * * * *